United States Patent
Karandikar et al.

(10) Patent No.: US 9,936,402 B2
(45) Date of Patent: Apr. 3, 2018

(54) METHODS AND SYSTEMS FOR MANAGING RELAYS IN LTE BASED COMMUNICATION NETWORKS

(71) Applicant: Indian Institute of Technology Bombay, Mumbai (IN)

(72) Inventors: Abhay Karandikar, Mumbai (IN); Pranav Kumar Jha, Gurgaon (IN); Meenakshi Tripathi, Bhopal (IN); Shantala R, Sirsi (IN); Upendra R. Gokhale, Sindhudurg (IN)

(73) Assignee: INDIAN INSTITUTE OF TECHNOLOGY BOMBAY, Mumbai (IN)

( * ) Notice: Subject to any disclaimer, the term of this patent is extended or adjusted under 35 U.S.C. 154(b) by 0 days.

(21) Appl. No.: 15/643,548

(22) Filed: Jul. 7, 2017

(65) Prior Publication Data
US 2017/0318480 A1 Nov. 2, 2017

(30) Foreign Application Priority Data

May 22, 2017 (IN) .............................. 201721017967

(51) Int. Cl.
*H04W 4/00* (2018.01)
*H04W 24/02* (2009.01)
*H04B 7/185* (2006.01)
*H04W 84/04* (2009.01)
*H04W 64/00* (2009.01)

(52) U.S. Cl.
CPC ........ *H04W 24/02* (2013.01); *H04B 7/18558* (2013.01); *H04W 84/045* (2013.01); *H04W 64/003* (2013.01)

(58) Field of Classification Search
CPC ...................................................... H04W 24/02
USPC ...................................................... 455/422.1
See application file for complete search history.

(56) References Cited

U.S. PATENT DOCUMENTS

2015/0124616 A1* 5/2015 Lohman ................ H04W 28/08
370/235

* cited by examiner

*Primary Examiner* — Joel Ajayi
(74) *Attorney, Agent, or Firm* — Mannava & Kang, P.C.; Vinay Malik

(57) ABSTRACT

Methods and systems for managing relays in LTE based communication networks. Embodiments herein use of a packet handler node and an additional radio interface in the UE, enabling the creation of an overlay network on top of an existing LTE network. The overlay network helps in the transfer of data between the UE and the AS even when the UE is not directly connected to the LTE network by encapsulating the data from the out-of-coverage UE within the IP packet of at least one nearby relay UE connected to the LTE network and is then forwarded to the LTE core network. The out-of-coverage UE uses the additional radio interface to send packets to the relay UE.

19 Claims, 5 Drawing Sheets

METHODS AND SYSTEMS FOR MANAGING RELAYS IN LTE BASED COMMUNICATION NETWORKS

CROSS REFERENCES TO RELATED APPLICATIONS

This applications claims priority from, IN Application Number 201721017967, filed on May 22, 2017, the disclosure of which is incorporated by reference herein.

TECHNICAL FIELD

Embodiments herein relate to Long Term Evolution (LTE) based communication systems (as disclosed in 3GPP TS 36.300), and more particularly to enabling relay functionality using User Equipments (UE) in LTE based communication systems.

BACKGROUND

In many situations, wireless cellular communication may get hindered due to reasons such as natural or man-made obstructions, network congestion, and so on. For example, due to poor penetration of radio signals inside concrete buildings, users present in the building may not be able to communicate, with the help of wireless cellular communication networks. However this is not desirable, especially during the time of emergencies. For example, when a fire rescue operation is ongoing in a building, wireless communication between the first responders is of utmost importance to save lives. In another example, at the edge of a cell, the received signal strengths can be much lower than for the users within the cell. Hence the user may be unable to make calls or avail other services.

Relay functionality was introduced in 3rd Generation Partnership Project (3GPP) Long Term Evolution (LTE) specification as part of LTE-Advanced (LTE-A), Release 10 standards, however the 3GPP relay node is a dedicated relay node, which is required to support the eNodeB functionality as well as a subset of UE functionality. The eNodeB functionality in the relay node is needed in order to support the connecting UEs and the UE functionality is required to connect the relay node to an eNodeB thus making it (relay node) a fairly complex node in terms of functionality.

OBJECTS

The principal object of embodiments herein is to disclose methods and systems for enhancing relay functionality in Long Term Evolution (LTE) based communication networks using overlay networks.

BRIEF DESCRIPTION OF FIGURES

Embodiments herein are illustrated in the accompanying drawings, through out which like reference letters indicate corresponding parts in the various figures. The embodiments herein will be better understood from the following description with reference to the drawings, in which.

DETAILED DESCRIPTION

Figure 1:
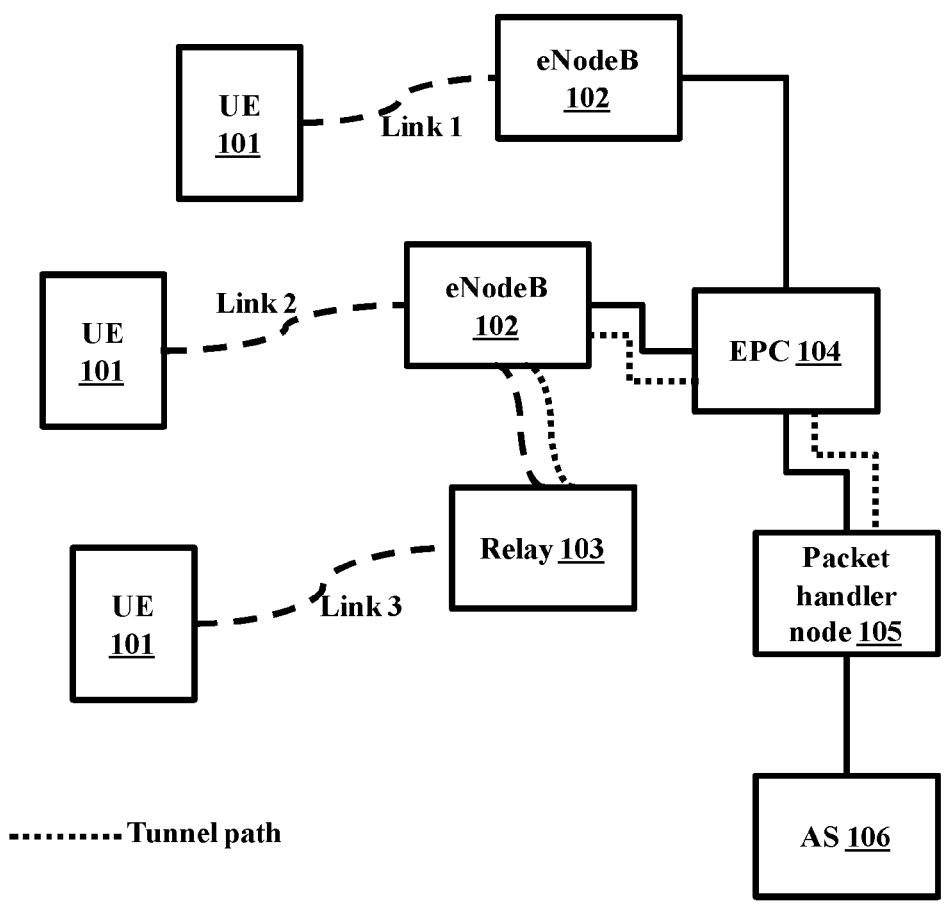
FIG. 1 depicts a LTE communication network comprising of a plurality of UEs connected to an Application Server (AS) through an eNodeB and a packet handler node, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve methods and systems for enhancing relay functionality in Long Term Evolution (LTE) based communication networks using overlay networks. Referring now to the drawings, and more particularly to FIGS. 1 through 5, where similar reference characters denote corresponding features consistently throughout the figures, there are shown preferred embodiments.

The User Equipment (UE) as disclosed herein could be any device configured to communicate using the LTE communication network. Examples of the UE can be, but not limited to, mobile phones, smart phones, tablets, laptops, computers, dongles, Internet of Things (IoT) devices, wearable computing devices, vehicle infotainment systems, navigation systems, security systems, and so on.

Embodiments herein use a tunneling mechanism and an additional radio interface in the UE, enabling the creation of an overlay network on top of an existing LTE network, wherein the additional radio interface can operate in ad-hoc mode. The overlay network helps in the transfer of data between the UE and an Application Server (AS), even when the UE is not directly connected to the LTE network, by encapsulating the data from a destination UE within the IP packet of a nearby UE which is connected to the LTE network, wherein the nearby UE is functioning as a relay. The nearby UE uses the additional radio interface to send packets to the network. The destination UEs can be UEs that do not have coverage, or UEs which will get a better service/signal from the relay, and so on.

FIG. 1 depicts a LTE communication network comprising of a plurality of UEs connected to an AS through an eNodeB and a packet handler node. When a UE 101 is connected directly to an eNodeB 102, no IP encapsulation is performed (such as links 1 and 2). However, when the UE 101 is connected to a relay (R1) 103 (such as link 3), R1 103 performs IP encapsulation on packets received from the destination UE 101. Here, R1 103 is a relay UE, wherein the UE can receive data on its supplementary interface from the destination UE 101. R1 103 can be connected to the UEs 101 using a suitable connection means such as a Wireless Local Area Network (WLAN) (for example, IEEE 802.11 (Wi-Fi)), a Personal Area Network (PAN) (for example, Bluetooth), or any other suitable means. R1 103 further transfers the encapsulated packets to the eNodeB 102, which forwards it to the Evolved Packet Core (EPC) 104. The EPC 104 can be connected to the AS 106 over an SGi interface, via the packet handler node 105. The packet handler node 105 de-encapsulates the packets, on detecting encapsulated packets received from the EPC 104, before forwarding the de-encapsulated packets to the AS 106. If the packet is a non-encapsulated packet, the packet handler node 105 can forward the packets directly to the AS 106.

Similarly, the packet handler node 105, on receiving a packet in the downlink can check if the packet is for a UE, which was using one or more relays for communication. If the packet is for a UE using a relays for communication, the packet handler node 105 can encapsulate the packet received from the AS in an IP packet addressed to the relay, before sending it to the relay 103. The relay 103 on determining that the packet is encapsulated, de-encapsulates the packet and forwards the de-encapsulated packet to the respective UE 101.

The mechanism to be followed by the UEs for selection of a relay could be defined for the network based on factors such as the application/deployment.

In an embodiment herein, a packet from the UE 101 can pass through more than one relay 103. The encapsulated packet can pass through more than one relay, wherein the relays in the multi-hop path and not connected to the LTE network forward the packet received from the destination UE, as-is to the next relay and the same can be facilitated through appropriate configuration of routing tables of the relay UEs. The final relay UE in the multi-hop path encapsulates the received packet and forwards the encapsulated packet to the network.

In an embodiment herein, the packet handler node 105 can be an independent node in the communication network. In an embodiment herein, the packet handler node 105 can be a part of the AS 106. In an embodiment herein, the packet handler node 105 can be a part of the EPC 104. In an embodiment herein, the packet handler node 105 can be split across one or more modules such as the AS 106, the EPC 104, and so on.

Figure 2:
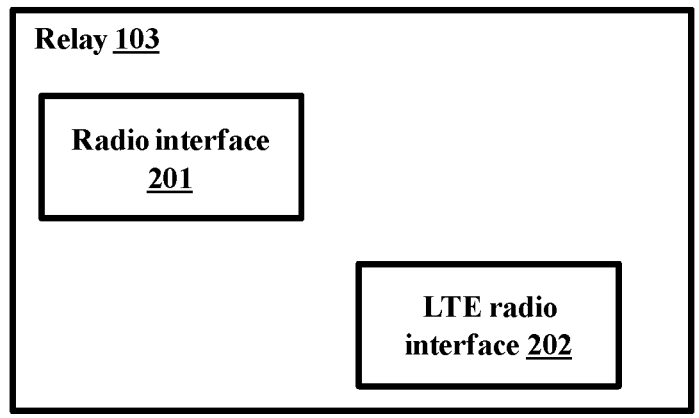
FIG. 2 depicts a UE performing the functions of a relay, according to embodiments as disclosed herein.

FIG. 2 depicts a UE performing the functions of a relay. The relay 103, as depicted, comprises of a radio interface 201 and a LTE radio interface 202. The relay 103 can comprise of other modules and interfaces, which will enable the relay to perform the normal functions and communications of a UE. The radio interface 201 can operate in ad-hoc mode. The radio interface 201 enables the UE to act as a relay 103 for destination UEs, wherein the radio interface 201 enables the destination UEs to communicate with other entities using the LTE network, even when the destination UEs are unable to connect to eNodeBs 102. The radio interface 201 allows the relay to establish direct communication with at least one destination UE and supports the UE to UE relay functionality without using the LTE network infrastructure. The relay 103 can encapsulate the data received from the UE(s) connected to the relay 103 and forward the encapsulated packets to the LTE Core network over the EPS bearers. The relay 103 can use a suitable means such as IP-in-IP tunneling mechanism to perform the encapsulation, wherein the outer IP belongs to the relay and the inner IP belongs to the destination UE. The radio interface 201 can then forward the encapsulated data packet to the eNodeB 102.

The relay 103 can check if packets received from the eNodeB 102 have been encapsulated. For example, consider that the packet handler node 105 has performed encapsulation using IP-in-IP tunneling; the radio interface 201 can determine whether encapsulation has been done using the type of protocol present in the outer IP header. On determining that the packet has been encapsulated, the radio interface 201 can de-encapsulate the packets and then forward the IP packet to the destination UE 101 or another relay 103, as applicable.

Figure 3:
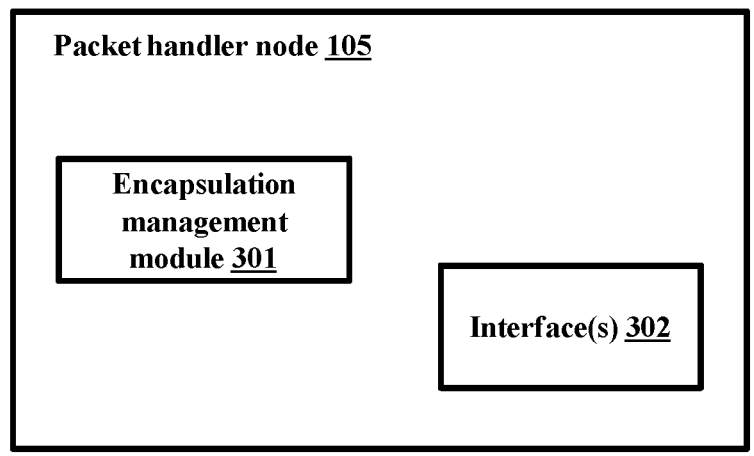
FIG. 3 depicts the packet handler node, according to embodiments as disclosed herein.

FIG. 3 depicts the packet handler node. The packet handler node 105, as depicted comprises of an encapsulation management module 301 and at least one interface 302. The interface(s) 302 enable the packet handler node 105 to communicate with the EPC 104 and the AS 106. The interface 302 can receive data packets sent from the EPC 104, destined for the AS 106. On receiving data packets, the encapsulation management module 301 checks if the packets have been encapsulated. For example, consider that the relay 103 has performed encapsulation using IP-in-IP tunneling; the encapsulation management module 301 can determine whether encapsulation has been done using the type of protocol present in the outer IP header. On determining that the packet has been encapsulated, the encapsulation management module 301 can de-encapsulate the packets to remove the outer IP header and then forward the IP packet to the AS 106 using the interface 302. On determining that the packet has not been encapsulated, the encapsulation management module 301 can forward the packets directly to the AS 106 using the interface 302.

The encapsulation management module 301 can encapsulate the data packets received from the AS 106 destined for the UE 101, if the UE 101 was using one or more relays for communication. The encapsulation management module 301 can use a suitable means such as IP-in-IP tunneling mechanism to perform the encapsulation, wherein the outer IP belongs to the relay and the inner IP belongs to the destination UE. The encapsulation management module 301 can then forward the encapsulated data packet to the relay 103, through the EPC 104.

Figure 4A:
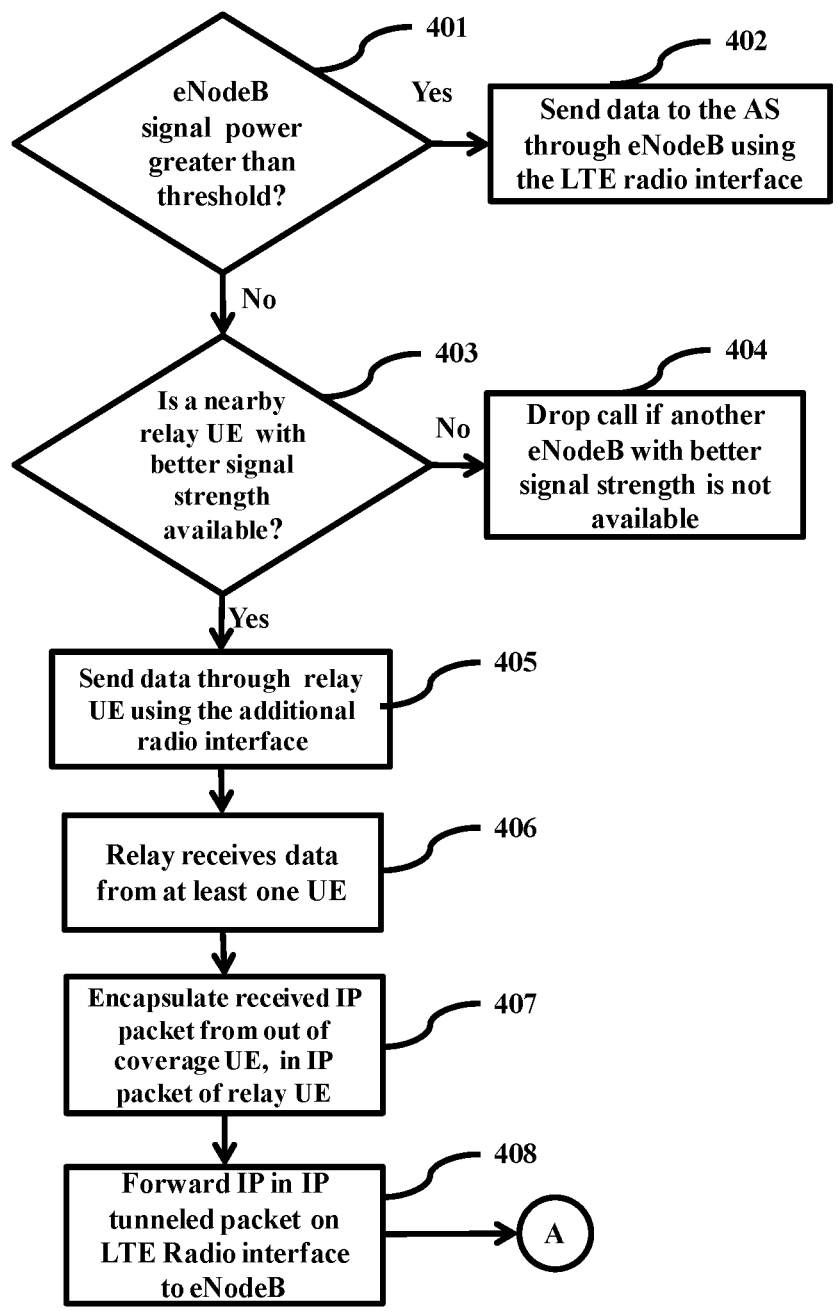
FIGS. 4a and 4b are flowcharts depicting the process of the functioning of a LTE communication network comprising of a UE functioning as a relay and a packet handler node for uplink data flow, according to embodiments as disclosed herein.
Figure 4B:
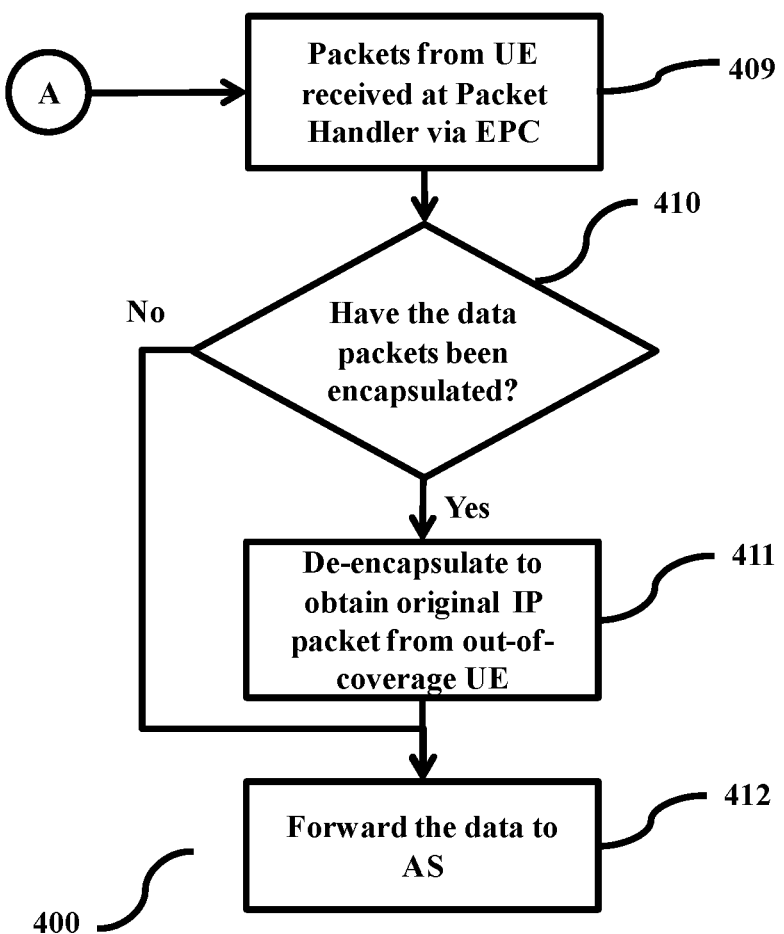

FIGS. 4a and 4b are flowcharts depicting the process of the functioning of a LTE communication network comprising of a UE functioning as a relay. When the UE 101 has to send data, the UE 101 checks (401) if the signal power from the eNodeB 102 is greater than a threshold. If the signal power from the eNodeB 102 is greater than the threshold, the UE 101 sends (402) the data to the AS 106 through the eNodeB 102, using the LTE radio interface 202. If the signal power from the eNodeB 102 is not greater than the threshold, the UE 101 checks (403) if there is a relay 103 (which is another UE 101 functioning as a relay) that provides better signal strength than the threshold. If there is no relay 103 that provides better signal strength than the threshold, the UE 101 does not transmit (404) the data. If there is a relay 103 that provides better signal strength than the threshold, the UE 101 sends (405) the data through the relay 103 using the interface 201. On the relay 103 receiving (406) data from the destination UE 101, the relay 103 encapsulates (407) the received data within its IP packet and the relay 103 forwards (408) the encapsulated data to the AS 106 on the LTE radio interface through the eNodeB 102, the EPC 104 and the packet handler node 105. The packet handler node 105 receives (409) the data, via the EPC 104. On receiving data packets, the packet handler node 105 checks (410) if the packets have been encapsulated. On determining that the packet has been encapsulated, the packet handler node 105 de-encapsulates (411) the packets and then forwards (412)

the actual IP packets sent by the destination UE, to the AS 106. On determining that the packet has not been encapsulated, the packet handler node 105 forwards (412) the packets using the interface 302, as it is to the AS 106. The various actions in method 400 may be performed in the order presented, in a different order or simultaneously. Further, in some embodiments, some actions listed in FIGS. 4*a* and 4*b* may be omitted.

Figure 5:
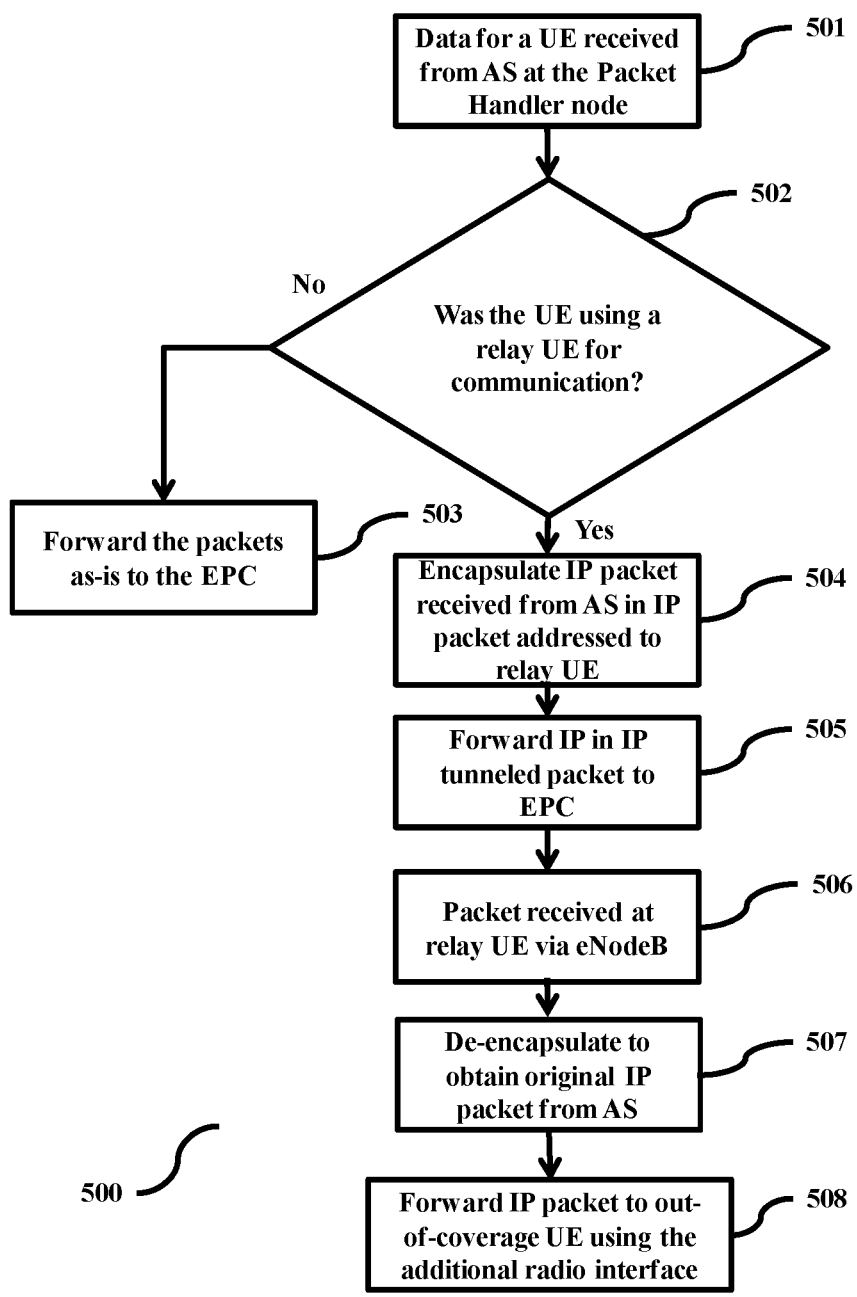
FIG. 5 is a flowchart depicting the process of the functioning of a LTE communication network comprising of a UE functioning as a relay and a packet handler node for downlink data flow, according to embodiments as disclosed herein.

FIG. 5 is a flowchart depicting the process of the functioning of a LTE communication network comprising of a UE functioning as a relay in the downlink. On receiving (501) data from an AS 106 for a destination UE 101, the packet handler node 105 checks (502) if the UE 101 was using one or more relays for communication. If the UE 101 was not using one or more relays for communication, the packet handler node 105 forwards (503) the data to the EPC 104. If the UE 101 was using one or more relays for communication, the packet handler node 105 encapsulates (504) the received data inside LTE Evolved Packet System (EPS) bearers corresponding to the relay 103 and forwards (505) the encapsulated data to the respective relay 103, through the EPC 104 and the eNodeB 102. On receiving the data packets (506), the relay 103 de-encapsulates (507) the packets and then forwards (508) the packets to the next module, which can be another relay 103 or the destination UE 101, using the interface 201. The various actions in method 500 may be performed in the order presented, in a different order or simultaneously. Further, in some embodiments, some actions listed in FIG. 5 may be omitted.

Consider a scenario where the UE 101 moves out of the coverage area of the eNodeB 102 and is in the vicinity of the relay 103. Here the UE 101 can have only an indirect connectivity to the LTE network. As soon as the UE 101 is in the vicinity of the relay 103 and not in the direct eNodeB 102 coverage area, the UE 101 can initiate data transfer (dummy data, if no real application level data is required to be sent at this stage) to the AS 106 through the relay 103 to indicate to the packet handler node 105 that the UE 101 does not have direct connectivity to the network and can be reached only through the relay 103. In order to send data to the AS 106, the UE 101 sends IP packets to the relay 103. When the relay 103 receives an IP packet from the UE 101 over the direct radio link between them, it initiates data transfer to the AS on behalf of the UE by encapsulating a UE packet in its own IP packet (IP-in-IP tunnel) and sending it over one of the radio bearers allocated by the LTE network for it (Relay Device). If the relay 103 is not connected to the network at the time of receiving the data packets from the UE 101, the relay 103 uses the standard LTE procedures to connect to the LTE network, for example, "Attach or Service Request procedure", before initiating the data transfer.

This information is stored by the packet handler node 105 and is used for downlink data transfer till there is a change in the location of the UE 101 due to mobility, i.e., as long as the UE 101 is behind the relay 103, the downlink data packets for the UE 101 are forwarded towards the EPC 104 by the packet handler node 105 only after encapsulating the UE IP packets in the IP packets of the relay 103. This mechanism of encapsulation (IP-in-IP tunnel) also takes care of the scenario when the relay 103 is not connected to the LTE network. In this scenario, when the EPC 104 receives an outer IP packet containing the IP address of the relay 103, the LTE network can initiate a paging procedure towards the relay 103 so that the relay 103 can establish a connection to the LTE network and the data transfer can be initiated. When the UE is in the LTE coverage area and can directly connect to the LTE network, it uses the standard LTE procedure to connect to the LTE network and transfer uplink/downlink data to/from the Application Server. To summarize, whenever a UE changes its location, i.e., moves out of the coverage area of a relay 103 to the direct LTE coverage area or moves out of direct LTE coverage to the coverage area of the relay 103, the UE 101 informs the packet handler node 105 about the change in its location so that the packet handler node 105 can correctly route the data for the UE, i.e., either directly through the LTE network or indirectly through an appropriate relay 103.

In an example scenario, at the edge of a cell, the received signal strengths can be much lower than for the users within the cell. When a moving user is at the cell edge, the user could connect to a UE in the vicinity connected to the network, and use the relay functionality for a short period of time until the user is able to connect to the next suitable base station to provide seamless connectivity.

Embodiments herein support seamless handover of a UE from an eNodeB to a Relay and vice versa. Embodiments disclosed herein are also able to support the QoS requirements of the relayed data. Embodiments herein do not require any changes in existing LTE network infrastructure, such as, eNodeB, Mobility Management Entity (MME), Serving Gateway (SGW), and EPC.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A method for communication in a Long Term Evolution (LTE) based communication network, the method comprising encapsulating at least one data packet received from at least one UE by a relay using IP packet of the relay, wherein a User Equipment (UE) is functioning as the relay between at least one User Equipment (UE) and an eNodeB and the relay and the UE comprise of an additional radio interface;

forwarding the at least one encapsulated data packet by the relay;

determining whether a received data packet has been encapsulated by checking type of protocol present in outer IP header of the received data packet by a packet handler node, wherein the packet handler node is located between an Evolved Packet Core (EPC) and an Application Server (AS);

de-encapsulating the encapsulated data packet by the packet handler node; and forwarding the de-encapsulated data packet to the AS by the packet handler node.

2. The method, as claimed in claim 1, wherein the relay performs encapsulation using IP-in-IP tunneling mechanism.

3. The method, as claimed in claim 1, wherein the method further comprises performing seamless handover of the UE from the relay to an eNodeB and vice versa.

4. A method for communication in a Long Term Evolution (LTE) based communication network, the method comprising
   encapsulating at least one data packet received from the AS by a packet handler node located between an Evolved Packet Core (EPC) and an Application Server (AS), when the data packet is for a UE which is connected to an eNodeB through at least one relay, wherein the encapsulation is done in an IP packet destined for the at least one relay;
   forwarding the at least one encapsulated data packet to the relay by the packet handler node, wherein a User Equipment (UE) is functioning as the relay between at least one User Equipment (UE) and the eNodeB and the relay and the UE comprise of an additional radio interface;
   determining whether a received data packet has been encapsulated by checking type of protocol present in outer IP header of the received data packet by the relay;
   de-encapsulating the encapsulated data packet by the relay; and
   forwarding the de-encapsulated data packet by the relay to the UE.

5. The method, as claimed in claim 4, wherein the packet handler node performs encapsulation using IP-in-IP tunneling mechanism.

6. The method, as claimed in claim 4, wherein the method further comprises
   informing the packet handler node by the UE about a change in location of the UE; and
   routing data to the UE by the packet handler node, based on the location of the UE.

7. The method, as claimed in claim 4, wherein the method further comprises performing seamless handover of the UE from the relay to an eNodeB and vice versa.

8. A Long Term Evolution (LTE) based communication network, the network comprising
   a relay comprising of an additional radio interface configured for
      encapsulating at least one data packet received from at least one UE using IP packet of the relay, wherein a User Equipment (UE) is functioning as the relay between at least one User Equipment (UE) and an eNodeB and the UE comprises of an additional radio interface; and
      forwarding the at least one encapsulated data packet to a packet handler node; and
   the packet handler node located between an Evolved Packet Core (EPC) and an Application Server (AS) and configured for
      determining whether a received data packet has been encapsulated by checking type of protocol present in outer IP header of the received data packet;
      de-encapsulating the encapsulated data packet; and
      forwarding the de-encapsulated data packet to the AS.

9. The network, as claimed in claim 8, wherein the relay is configured for performing encapsulation using IP-in-IP tunneling mechanism.

10. The network, as claimed in claim 8, wherein the network is further configured for performing seamless handover of the UE from the relay to an eNodeB and vice versa.

11. A Long Term Evolution (LTE) based communication network, the network comprising
   a packet handler node located between an Evolved Packet Core (EPC) and an Application Server (AS) configured for
      encapsulating at least one data packet received from the AS, when the data packet is for a UE which is connected to an eNodeB through at least one relay, wherein the encapsulation is done in an IP packet destined for the at least one relay; and
      forwarding the at least one encapsulated data packet to a relay; and the relay comprising of an additional radio interface, wherein a User Equipment (UE) is functioning as the relay between at least one User Equipment (UE) and the eNodeB and the UE comprising of an additional radio interface, configured for
      determining whether a received data packet has been encapsulated by checking type of protocol present in outer IP header of the received data packet;
      de-encapsulating the encapsulated data packet; and
      forwarding the de-encapsulated data packet to the UE.

12. The network, as claimed in claim 11, wherein the packet handler node is configured for performing encapsulation using IP-in-IP tunneling mechanism.

13. The network, as claimed in claim 11, wherein the packet handler node is further configured for routing data to the UE, based on the location of the UE.

14. The network, as claimed in claim 11, wherein the network is further configured for performing seamless handover of the UE from the relay to an eNodeB and vice versa.

15. A relay (103) in a Long Term Evolution (LTE) based communication network configured for
   encapsulating at least one data packet received from the UE using IP packet of the relay, wherein the relay is a User Equipment (UE) comprising of an additional radio interface and is between at least one User Equipment (UE) and an eNodeB in a Long Term Evolution (LTE) based communication network, wherein the UE comprises of an additional radio interface;
   forwarding the at least one encapsulated data packet to a packet handler node, wherein the packet handler node is located between an Evolved Packet Core (EPC) and an Application Server (AS);
   determining whether a data packet received from the packet handler node has been encapsulated by checking type of protocol present in outer IP header of the received data packet, wherein the data packet is for the UE which is connected to the eNodeB through at least the relay and the UE comprises of an additional radio interface;
   de-encapsulating an encapsulated data packet received; and
   forwarding the de-encapsulated data packet to the UE.

16. The relay, as claimed in claim 15, wherein the relay is configured for performing encapsulation using IP-in-IP tunneling mechanism.

17. An apparatus in a Long Term Evolution (LTE) based communication network, configured for
   encapsulating at least one data packet received from an Application Server (AS) in an IP packet destined for at least one relay, when the data packet is for a UE which is connected to the eNodeB through the at least one relay, wherein at least one User Equipment (UE) is functioning as the relay between at least one User Equipment (UE) and an eNodeB and the relay and the UE comprise of an additional radio interface;
   forwarding the at least one encapsulated data packet to the relay;
   determining whether a data packet received from the relay has been encapsulated by checking type of protocol present in outer IP header of the received data packet;

de-encapsulating an encapsulated data packet; and
forwarding the de-encapsulated data packet to the AS,
wherein the apparatus is located between an Evolved Packet Core (EPC) and the AS.

18. The apparatus, as claimed in claim 17, wherein the apparatus is configured for performing encapsulation using IP-in-IP tunneling mechanism.

19. The apparatus, as claimed in claim 17, wherein the apparatus is further configured for routing data to the UE, based on the location of the UE.

* * * * *